(12) United States Patent
Amberkar et al.

(10) Patent No.: US 6,535,805 B2
(45) Date of Patent: Mar. 18, 2003

(54) ROBUST DETERMINATION OF HAND-WHEEL POSITION

(75) Inventors: Aparna S Amberkar, Saginaw, MI (US); Mark Philip Colosky, Vassar, MI (US)

(73) Assignee: Delphi Technologies, Inc., Troy, MI (US)

( * ) Notice: Subject to any disclaimer, the term of this patent is extended or adjusted under 35 U.S.C. 154(b) by 22 days.

(21) Appl. No.: 09/927,610

(22) Filed: Aug. 10, 2001

(65) Prior Publication Data

US 2003/0033064 A1 Feb. 13, 2003

(51) Int. Cl.[7] .............................. G06F 7/00; G06F 17/00
(52) U.S. Cl. .......................... 701/41; 180/443; 180/400
(58) Field of Search ............................. 701/41; 180/6.2, 180/6.24, 6.28, 6.48, 6.6, 400, 401, 416, 443, 446

(56) References Cited

U.S. PATENT DOCUMENTS

| 5,668,722 A | | 9/1997 | Kaufmann et al. | |
|---|---|---|---|---|
| 5,948,030 A | | 9/1999 | Miller et al. | |
| 6,039,144 A | | 3/2000 | Chandy et al. | |
| 6,050,360 A | * | 4/2000 | Pattok et al. | 180/443 |
| 6,053,270 A | * | 4/2000 | Nishikawa et al. | 180/168 |
| 6,068,078 A | * | 5/2000 | Rau et al. | 180/446 |
| 6,161,068 A | * | 12/2000 | Kurishige et al. | 180/400 |
| 6,184,637 B1 | * | 2/2001 | Yamawaki et al. | 318/432 |
| 6,324,452 B1 | * | 11/2001 | Ikegaya | 180/422 |
| 6,381,528 B1 | * | 4/2002 | Kawada et al. | 180/443 |
| 6,405,113 B1 | * | 6/2002 | Yamawaki et al. | 180/446 |
| 6,408,234 B1 | * | 6/2002 | Wittig | 180/443 |
| 6,442,462 B1 | * | 8/2002 | Nishizaki et al. | 701/41 |

* cited by examiner

Primary Examiner—William A. Cuchlinski, Jr.
Assistant Examiner—Olga Hernandez
(74) Attorney, Agent, or Firm—Edmund P. Anderson

(57) ABSTRACT

An absolute hand-wheel position tracking system for an electric power steering system having a hand-wheel, an assist motor for providing an assist torque disposed relative to the hand-wheel, and a motor position sensor responsive to the assist motor, includes a hand-wheel position initialization function responsive to the hand-wheel; a motor position correction and scaling function responsive to the motor position sensor and responsive to the assist torque; an enable function responsive to the assist torque and responsive to the hand-wheel position initialization function; and an absolute hand-wheel position generation function in signal communication with the hand-wheel position initialization function, the motor position correction and scaling function, and the enable function.

25 Claims, 8 Drawing Sheets

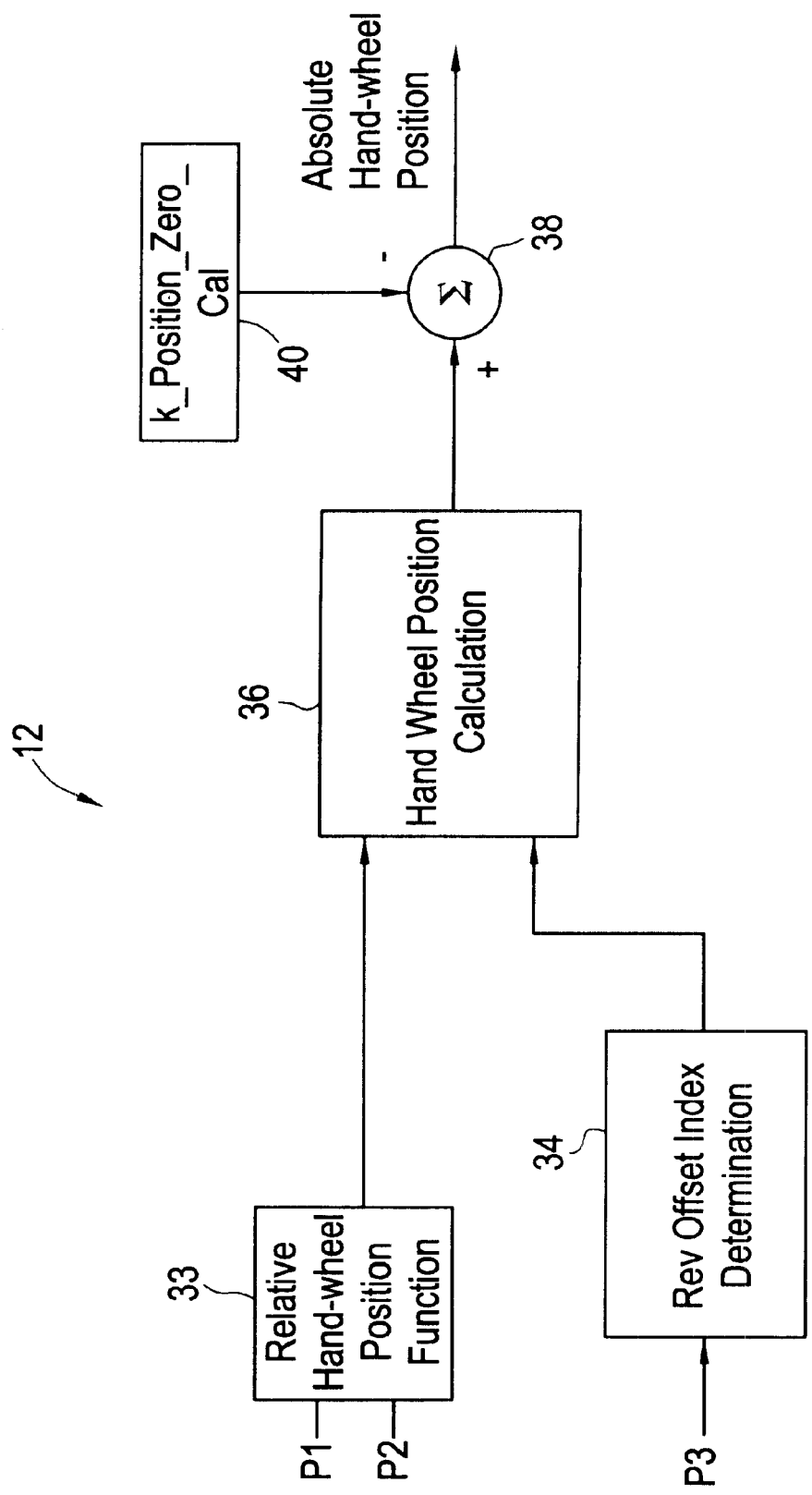

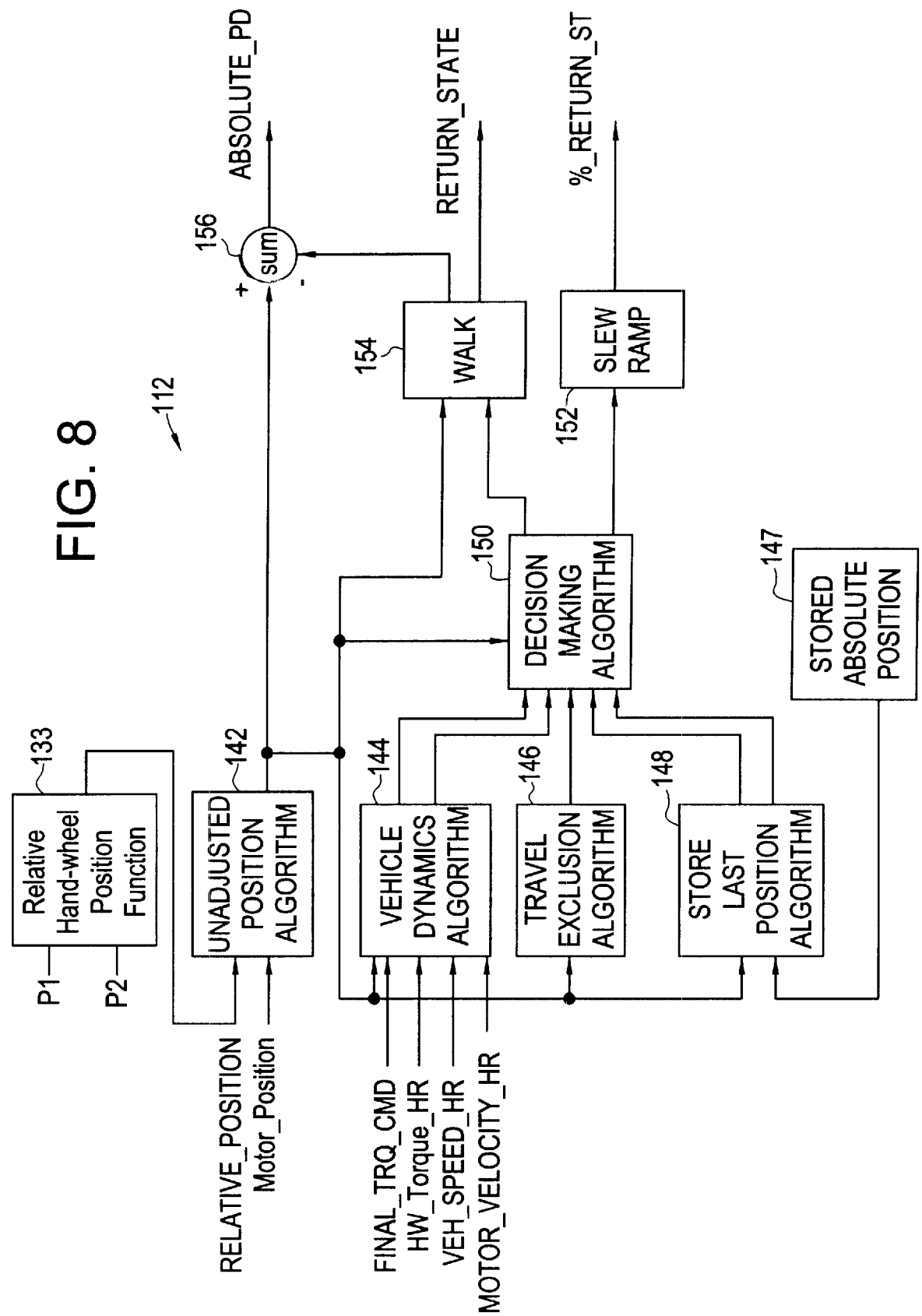

ROBUST DETERMINATION OF HAND-WHEEL POSITION

BACKGROUND

In an Electric Power Steering ("EPS") system, it may be desirable to provide the absolute hand-wheel position. This position may be used, for example, to cause the hand-wheel to return to center following a steering input. The return to center effect simulates the self-aligning torque due to positive caster of a conventional manual steering system, and causes the vehicle to be more comfortably controlled by a driver. To determine the center, absolute hand-wheel position information may be used. Typically, the absolute hand-wheel position is derived using a dual triangular wave ("DTW") sensor to provide two position signals from which the relative position within 360 hand-wheel degrees is obtained. This information is then used by typically complex algorithms to determine the absolute hand-wheel position. A function of the algorithms is to provide the revolution offset or the "turn" at which the hand-wheel is currently positioned.

To perform this task, typical algorithms may make use of torque signals and relative position signals to estimate the driving conditions and vehicle dynamics, require the hand-wheel to have moved through a certain travel to produce a travel exclusion signal, and/or use a previous position signal that is retrieved from a microprocessor memory.

SUMMARY

The above described and other features are exemplified by the following Figures and Description in which an absolute hand-wheel position tracking system for an electric power steering system having a hand-wheel, an assist motor for providing an assist torque disposed relative to the hand-wheel, and a motor position sensor responsive to the assist motor, includes a hand-wheel position initialization function responsive to the hand-wheel; a motor position correction and scaling function responsive to the motor position sensor and responsive to the assist torque; an enable function responsive to the assist torque and responsive to the hand-wheel position initialization function; and an absolute hand-wheel position generation function in signal communication with the hand-wheel position initialization function, the motor position correction and scaling function, and the enable function.

BRIEF DESCRIPTION OF THE DRAWINGS

Referring now to the Figures wherein like elements are numbered alike:

FIG. 7 is a schematic diagram for a hand-wheel position initialization function for an absolute hand-wheel position tracking system; and FIG. 8 is a schematic diagram for an alternate hand-wheel position initialization function for an absolute hand-wheel position tracking system.

DESCRIPTION OF PREFERRED EMBODIMENTS

An absolute hand-wheel position tracking system for an electric power steering ("EPS") system makes the process of hand-wheel position tracking highly robust to hand-wheel position sensor failures and less complex in terms of software overhead. In addition, the method and apparatus of the tracking system may be substituted for direct absolute hand-wheel position sensing in many applications.

The new method uses hand-wheel position information to calibrate or initialize motor position information, and thereafter uses the corresponding motor position signal as the source of the primary position information. Motor position information is already available within many EPS systems that use such sensor signals for motor commutation.

Figure 1:
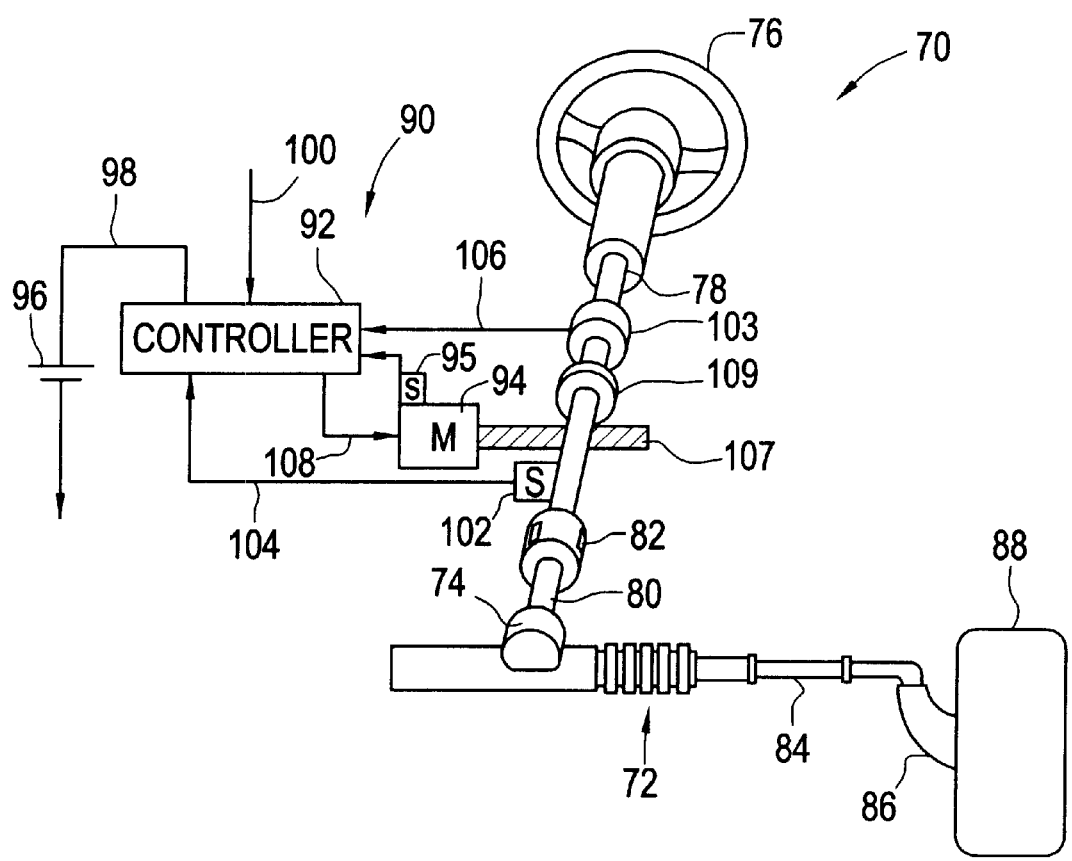
FIG. 1 is a schematic diagram of an electric power steering system having a controller.

Referring to FIG. 1, reference numeral 70 generally designates an EPS system for a motor vehicle. A steering mechanism 72 is a rack-and-pinion type mechanism that includes a toothed rack (not shown) and a pinion gear (also not shown) located under a gear housing 74. A steering wheel 76 is coupled to an upper steering shaft 78. As the steering wheel 76 is turned, the upper steering shaft 78, which is connected to a lower steering shaft 80 through a universal joint 82, turns the pinion gear. Rotation of the pinion gear moves the toothed rack, which moves tie rods 84 (only one shown) that, in turn, move steering knuckles 86 (only one shown), which turn wheels 88 (only one shown).

EPS assist torque is provided through an assist unit generally designated by reference numeral 90, which includes a controller 92 and an electric motor 94. A motor position commutation sensor 95 measures the relative position of the motor 94. The controller 92 is powered by a vehicle power supply 96 through a supply line 98. The controller 92 receives a signal indicative of the vehicle velocity on signal line 100. Initial hand-wheel position is measured by hand-wheel position sensor 102 and fed to the controller 92 through line 104. Position sensor 102 may be an optical-encoding type of sensor, a variable resistance type of sensor, or any other suitable type of position sensor for performing the functions of the hand-wheel position sensor 102.

As the steering wheel 76 is turned, the torque sensor 103 senses the torque applied to the steering wheel 76 by a vehicle operator. The torque sensor 103 may include a torsion bar (not shown) and a variable-resistance type of sensor (also not shown) that outputs a variable resistance signal to the controller 92 through a line 106 in relation to the amount of twist on the torsion bar. Other suitable torque-sensing devices used with known signal processing techniques will suffice in alternate embodiments.

In response to the inputs on lines 100, 104 and 106, the controller 92 sends a command signal through line 108 to the electric motor 94. The motor 94, in turn, supplies torque-assist to the steering system through a worm 107 and a worm gear 109, in order to provide a steering torque assist to the vehicle steering system in addition to a steering force exerted by the vehicle operator.

Figure 2:
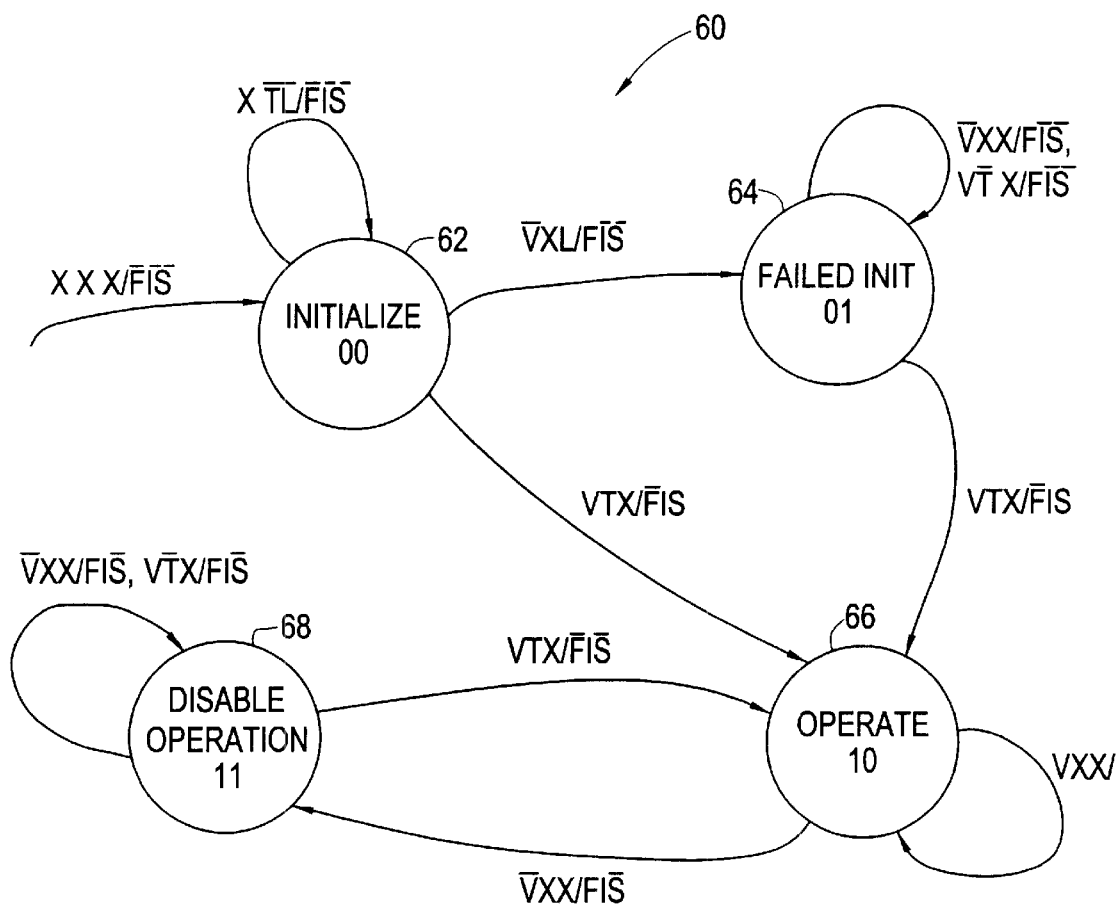
FIG. 2 is a state-transition diagram for a hand-wheel position initialization function of the controller of FIG. 1.

Turning now to FIG. 2, the controller 92 of FIG. 1 includes a hand-wheel position initialization function having a state diagram generally designated by the reference numeral 60, including an initialize state 62 and an operate state 66. In the initialize state 62, the hand-wheel position initialization function (described below) determines the validity of hand-wheel position sensor signals in order to calculate the measured hand-wheel position by taking multiple sensor readings over a period of time to determine the validity of the received sensor signals.

If the position initialization function determines that the signals are invalid for a given period of time, as described below with respect to FIG. 3, it produces a signal indicative of a failed initialization and the hand-wheel position initialization function enters a failed initialization state 64. If the current state of the hand-wheel position initialization function is the initialize state 62 or the failed initialization ("Failed Init") state 64, and the position function determines that the signals are valid for a given period of time, then the hand-wheel position initialization function returns a signal indicative of a successful initialization, and the hand-wheel position initialization function enters operate state 66. In the operate state 66, the hand-wheel position initialization function calculates a measured hand-wheel position with a calculation function (described below) until operation is disabled and the hand-wheel position initialization function enters a disable operation state 68 where the measured hand-wheel position is not used.

Thus, during operation in the initialize state 62, the software determines if the hand-wheel position signals are valid in order to allow calculation of an absolute hand-wheel position, initialize system timers, and monitor validity inputs for the timer duration to accordingly update the state-transition vector and execute state function logic (described below with reference to FIG. 3) to set the outputs.

The hand-wheel position initialization function operates in the FAILED INIT state 64 if it failed to determine that the hand-wheel position signals were valid on initialization. The appropriate fault flags are set and the software executes timer functions and monitors validity inputs to accordingly update the transition vector and execute state function logic to set the outputs once the initialization is successful.

The hand-wheel position initialization function operates in the OPERATE state 66 to compute the hand-wheel position as described below. The hand-wheel position initialization function continues to monitor the validity inputs to accordingly update the state-transition vector and execute state function logic to set the outputs. The hand-wheel position initialization function will enter the disable operation state 68 when a signal becomes invalid and start checking timers.

Figure 3:
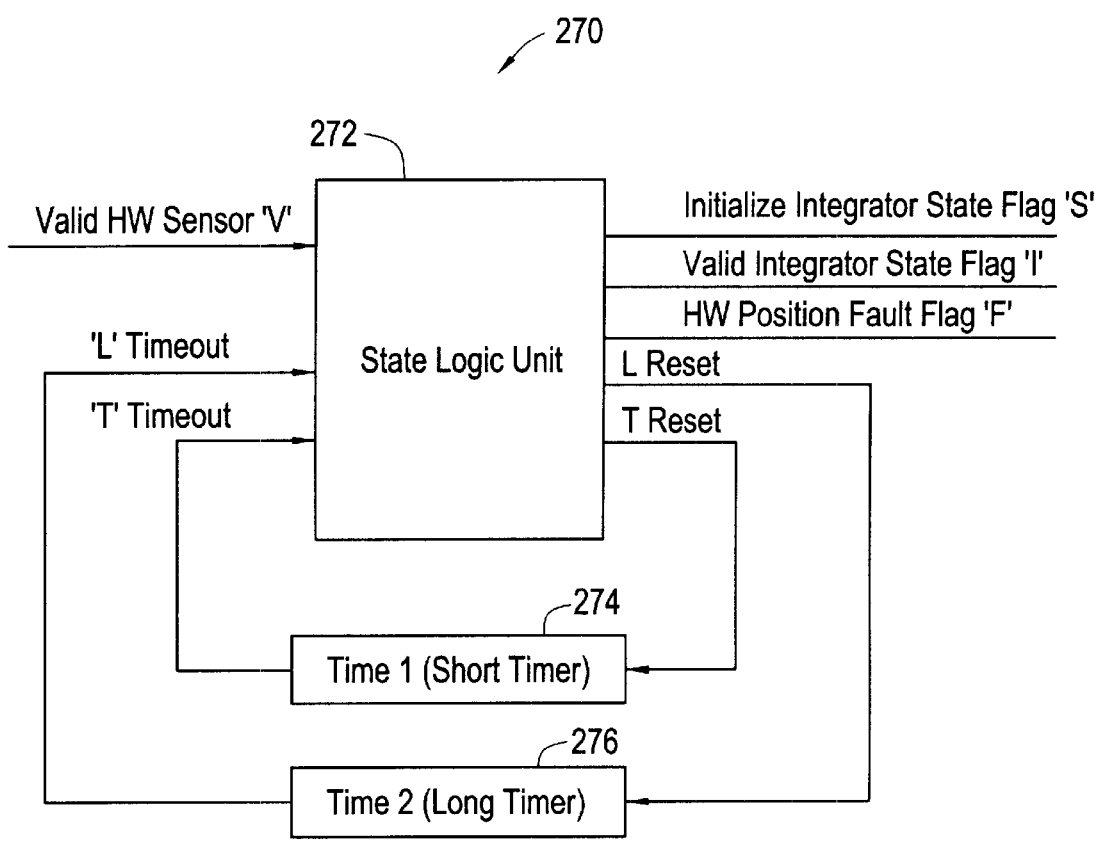
FIG. 3 is a schematic diagram of a hand-wheel position tracking state-transition function corresponding to the state-transition diagram of FIG. 2.

As shown in FIG. 3, a hand-wheel position state logic function is indicated generally by the reference numeral 270. A state logic unit 272 receives a signal indicative of a valid hand-wheel sensor signal, a signal indicative of a short-duration timer value from a short-duration timer 274, and a signal indicative of a long-duration timer value from a long-duration timer 276. The state function 270 produces outputs including an initialize integrator flag, a valid hand-wheel position initialization flag, a hand-wheel position fault flag, a short-duration timer reset value for the short-duration timer 274, and a long-duration timer reset value for the long-duration timer 276.

In operation, the valid hand-wheel position initialization flag is TRUE if all status check signals are true, and FALSE if any status check signal is false. The short-duration timer is used to verify the signal status. The timer is reset when the current value of the valid hand-wheel position flag does not equal the previous value. The short-duration timer is incremented and limited to a first calibratable threshold. The timer status is used to generate the "T" input to the state logic unit 272. If the timer value is greater than or equal to the first calibratable threshold, "T" is TRUE and the timer is limited to the threshold. If the timer is less than the first calibratable threshold, "T" is FALSE and the timer continues to operate.

The long-duration timer is used to verify the signal status for a longer time duration than the short-duration timer. The long-duration timer is also reset when the current value of the valid hand-wheel position initialization flag does not equal the previous value. The timer is incremented and limited to a second calibratable threshold. The timer status is used to generate the "L" input. If the timer value is greater than or equal to the second calibratable threshold, "L" is TRUE and the timer is limited to the threshold. If the timer is less than the second calibratable threshold, "L" is FALSE and the timer continues to operate.

Thus, the shorter duration timer flag T is monitored to check for valid sensor signals, but if the sensor produces an invalid signal during this shorter period, the longer duration timer flag L is monitored to assure that the sensor signal remains valid for a longer period of time following the initial invalid signal. The hand-wheel position fault flag "F" is used to indicate a fault. "F" is the hand-wheel position fault output for the hand-wheel position function 12 of FIG. 4, described below. "F" is TRUE to indicate that a fault exists and "F" is FALSE to indicate that no hand-wheel position fault exists. "F" is initialized to FALSE.

The valid hand-wheel position initialization flag "I" is TRUE once the hand-wheel position function has been initialized correctly. "I" is the valid initialization flag for the hand-wheel position function 12 of FIG. 4. "I" is TRUE to indicate that the function initialized correctly, and FALSE to indicate that the function has not initialized correctly. At start-up, "I" is initialized to FALSE.

The initialize integrator state flag "S" is TRUE to indicate that the software has transitioned from either the INITIALIZE or the FAILED INIT state to the OPERATE state. At start-up, "S" is initialized to FALSE. This flag is used for initializing the state variable of the Offset Error Integrator function, described below. The T and L timers are only used by the state logic unit 272.

Figure 4:
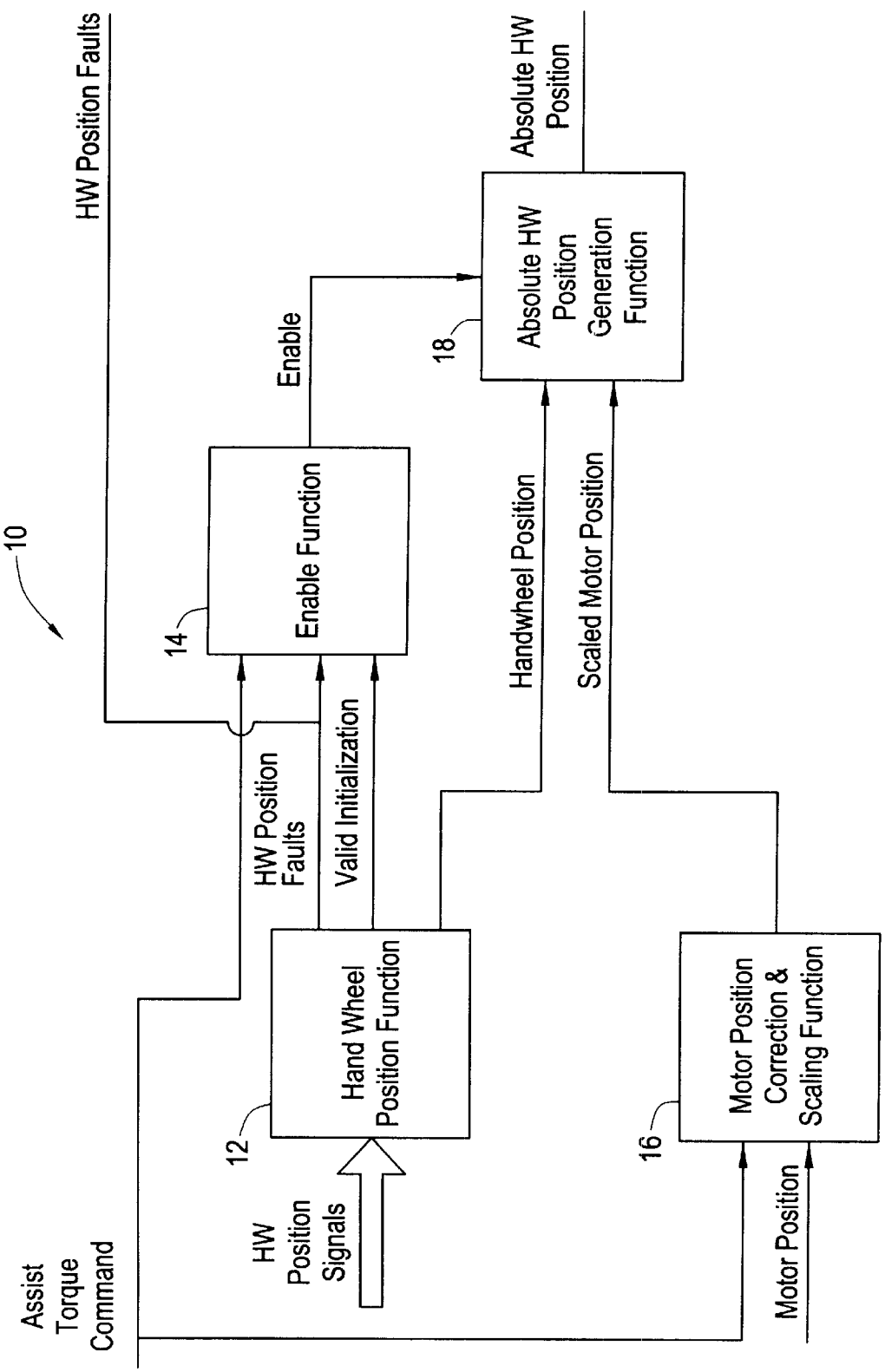
FIG. 4 is a schematic diagram for an absolute hand-wheel position tracking system portion of the controller of FIG. 1.

Turning now to FIG. 4, reference numeral 10 generally designates an absolute hand-wheel position tracking system of the controller 92 of FIG. 1. A hand-wheel position and initialization function block 12 receives signals indicative of the measured hand-wheel position from a sensor or predictive estimator, such as, for example, a dual triangular wave ("DTW") sensor (not shown), and directly determines the measured hand-wheel position.

The hand-wheel position initialization function block 12 also produces a binary signal indicative of a valid absolute hand-wheel position initialization, as well as a binary signal indicative of any hand-wheel position faults. The binary signals and a signal indicative of an assist torque are received by an enable function block 14, which produces a binary enable signal if there has been a valid initialization, there are no present hand-wheel position faults and the assist torque is less than a threshold torque to account for excessive wind-up.

A motor position correction and scaling function block 16 receives a signal indicative of motor position from the motor position sensor 95 of FIG. 1 and the signal indicative of assist torque from one of the torque sensor 103 of FIG. 1 or from the assist torque command signal, scales the signal indicative of motor position by a constant value, corrects for compliance error due to assist torque, and feeds the signal indicative of a scaled and corrected motor position to an absolute hand-wheel position generation function block 18.

The absolute hand-wheel position generation function block 18 also receives a signal indicative of measured hand-wheel position from the hand-wheel position initialization function block 12, and receives the binary enable signal from the enable function block 14. The absolute hand-wheel position generation function block 18 produces a signal indicative of the absolute hand-wheel position.

Thus, in operation, the inputs of the absolute hand-wheel position tracking system 10 are assist torque, hand-wheel position sensor and motor position signals, and the output is an absolute hand-wheel position signal. Measured hand-wheel position is used to initialize the motor position, which is used, in turn, to provide the output absolute hand-wheel position signal whether or not the current measured hand-wheel position signal is valid.

When steering assist is provided, the motor position has a small compliance with respect to the output shaft due to the motor coupling. The absolute hand-wheel position tracking system 10 compensates for this compliance to increase the accuracy of the absolute position signal.

Figure 5:
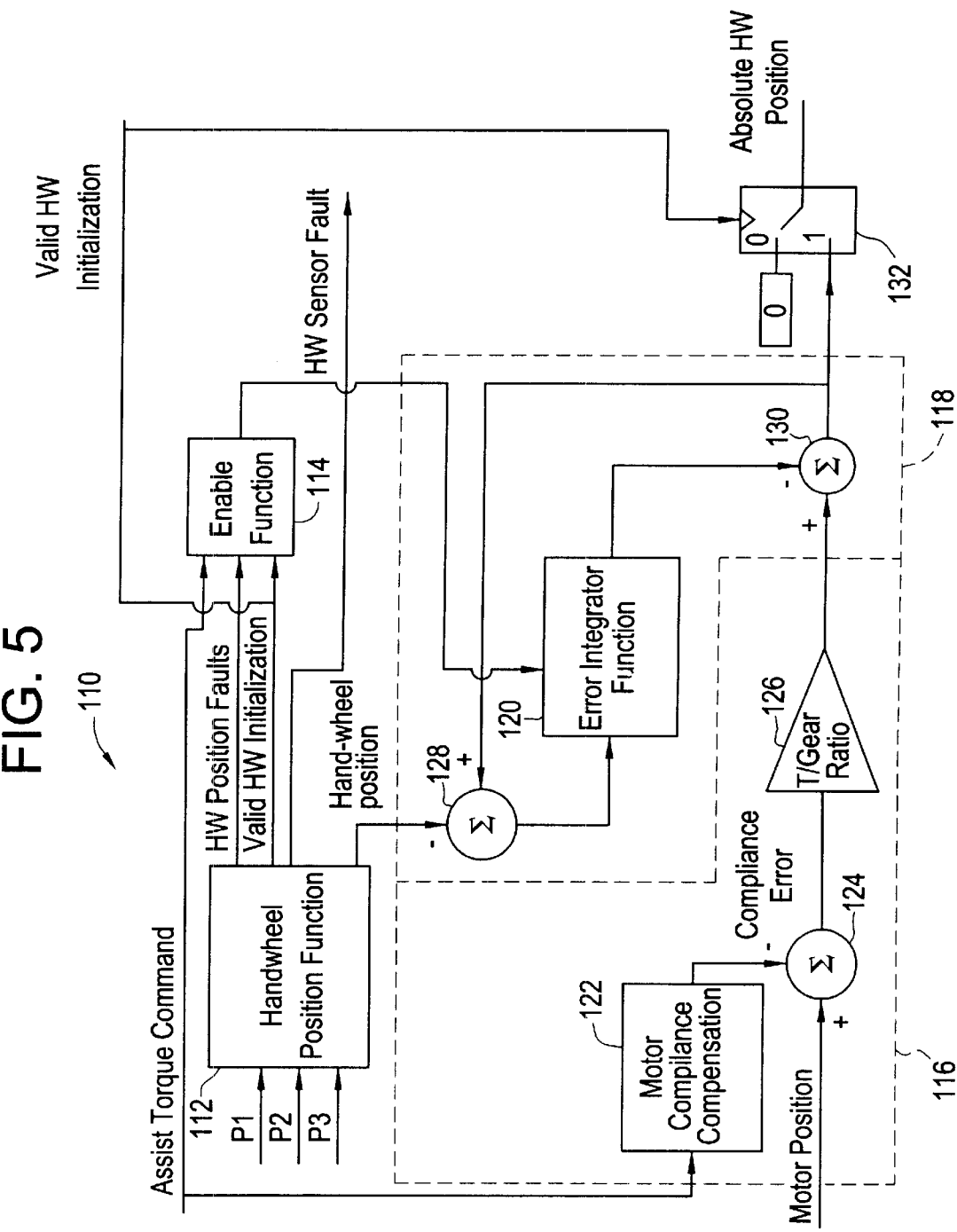
FIG. 5 is a schematic diagram for an alternate absolute hand-wheel position tracking system.

Referring now to FIG. 5, an alternate embodiment absolute hand-wheel position tracking system is generally designated by the reference numeral 110. The absolute hand-wheel position tracking system 110 is similar to the absolute hand-wheel position tracking system 10. Accordingly, like reference numerals preceded by the digit "1" are used to reference like features.

A hand-wheel position initialization function block 112 receives signals indicative of measured hand-wheel position, determines the validity of the position signal inputs for input to an enable function block 114, and outputs the initial measured hand-wheel position. The hand-wheel position initialization function block 112 also produces binary signals indicative of any hand-wheel position sensor faults, and a signal indicative of a valid initialization of the hand-wheel position initialization function 112. The validity signals and a signal indicative of the assist torque are received by the enable function block 114, which produces a binary enabling signal. A motor position correction and scaling function block 116 receives a signal indicative of assist torque at motor compliance compensation block 122, and computes a compliance error. A summing junction 124 receives a signal indicative of motor position from the motor position sensor 95 of FIG. 1, and corrects the motor position signal for any computed compliance error by subtracting the compliance error received at its inverting input. The output of the summing junction 124 is received by a scaling function 126 that scales the signal by a constant value corresponding to a motor gear ratio, and feeds the signal indicative of a scaled and corrected motor position in hand-wheel units to an absolute hand-wheel position generation function block 118.

The absolute hand-wheel position generation function block 118 receives the signal indicative of measured hand-wheel position from the hand-wheel position initialization function block 112 at an inverting input of summing junction 128, which feeds a signal indicative of a hand-wheel position offset error to an error integration function block 120. The error integration function block 120 is enabled according to the binary enabling signal received from the enable function block 114. When the error integration function block 120 receives a logically false binary enabling signal, it ceases to adjust the offset error but continues to output a signal indicative of the motor position zero by holding the last valid motor position zero.

The motor position zero is held to the last value by disabling the integration of further corrections until the measured hand-wheel position signal again becomes valid. The signal indicative of the motor position zero is received at the inverting input of a summing junction 130, which receives at its non-inverting input the signal indicative of a scaled and corrected motor position from the scaling function 126, and produces a signal indicative of a calculated absolute hand-wheel position that is fed back to the non-inverting input of the summing junction 128.

The signal indicative of calculated absolute hand-wheel position is received by a switch function block 132. The switch function block 132 also receives the signal indicative of a valid hand-wheel initialization from the hand-wheel position function block 112. When the signal indicative of a valid hand-wheel initialization is logically false, the switch function block 132 outputs a zero or null signal. When the signal indicative of a valid hand-wheel initialization is logically true, the switch function block 132 outputs the signal indicative of calculated absolute hand-wheel position received from the summing junction 130.

Thus, in operation, the inputs of the absolute hand-wheel position tracking system 110 are signals indicative of measured hand-wheel position, motor position, and assist torque, and the primary output is a signal indicative of absolute hand-wheel position. Measured hand-wheel position is used to initialize the motor position, which is used, in turn, to provide the output absolute hand-wheel position signal.

When steering assist is provided, the motor position has a small compliance with respect to the output shaft due to the motor coupling. The absolute hand-wheel position tracking system 110 compensates for this compliance to increase the accuracy of the absolute hand-wheel position signal.

Figure 6:
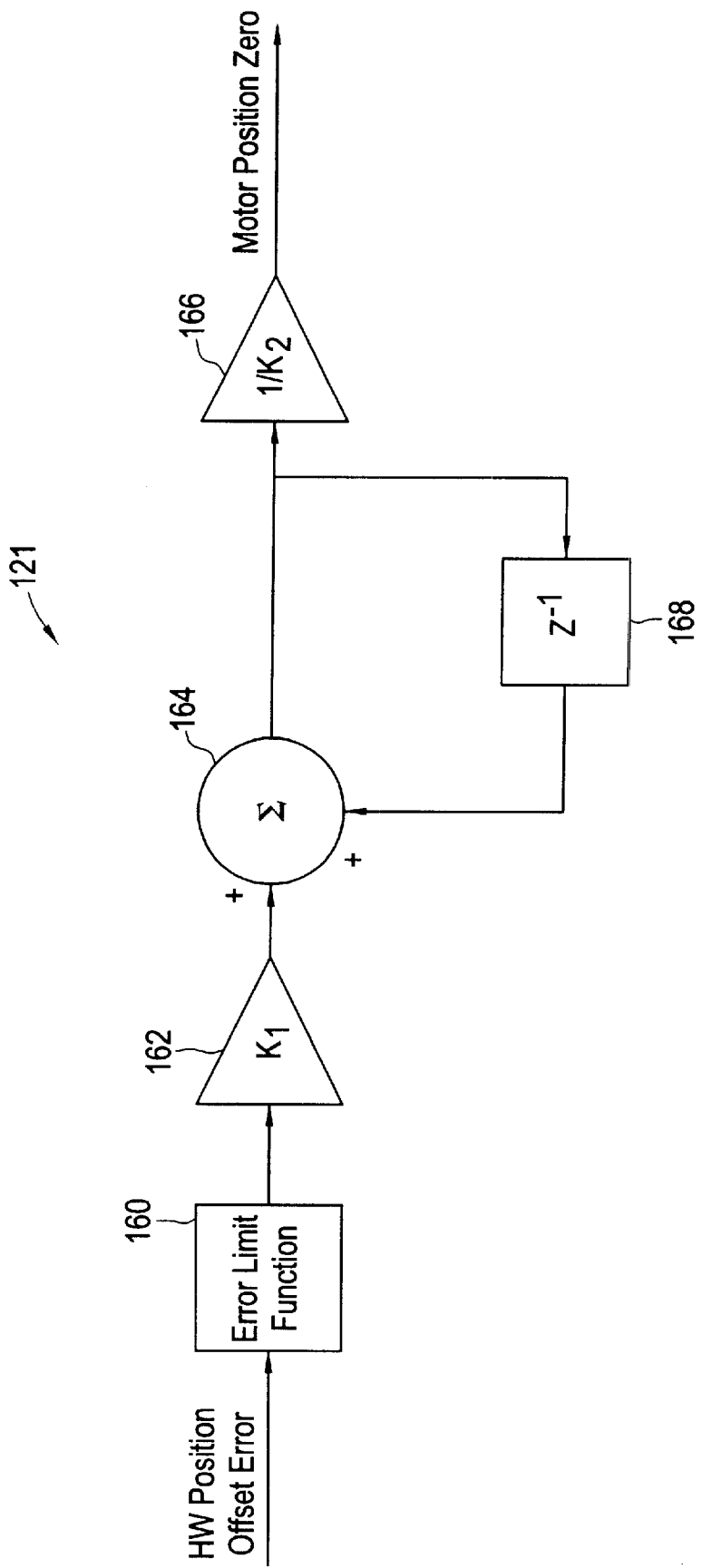
FIG. 6 is an offset error integration function for an absolute hand-wheel position tracking system.

Turning now to FIG. 6, a portion of the error integration function 120 of FIG. 5 is shown in greater detail and indicated generally by the reference numeral 121. The portion of the error integration function 121 receives the hand-wheel position offset error signal at an error limit function block 160. An output of the error limit function 160 is input to a scaler 162.

The scaled output of scaler 162 is input to a non-inverting input of a summing junction 164. An output of junction 164, indicative of an offset state, is input to a series divider 166. An output of the divider 166, which is indicative of zeroed motor position, is passed only if the enabling signal of function block 114 is logically true. The output of the summing junction 164 is a state variable indicative of the hand-wheel offset relative to the motor, which is fed back to a delay or integration element 168 having an output feeding back to a non-inverting input of the summing junction 164.

As shown in FIGS. 7 and 8, two exemplary configurations of the hand-wheel position calculation function are shown that may be used in the absolute hand-wheel position tracking systems 10 of FIG. 4 and 110 of FIG. 5, respectively. Thus, in alternate embodiments, the hand-wheel position initialization function blocks 12 of FIG. 4 and 112 of FIG. 5 can be any function blocks that calculate initial hand-wheel position from a hand-wheel position sensor or comparable source.

In FIG. 7, the hand-wheel position initialization function block 12 of FIG. 4 includes a relative hand-wheel position function block 33 that receives DTW sensor position signals P1 and P2, and produces a signal indicative of the relative hand-wheel position. A revolution offset index determination function block 34 receives a third signal indicative of the number of turns of the hand-wheel and produces a signal indicative of the revolution offset index. The signal indicative of the revolution offset index and the signal indicative of the relative hand-wheel position are received, in turn, as inputs to a hand-wheel position calculation function block 36, which outputs a signal indicative of hand-wheel position to a non-inverting input of a summing junction 38. An inverting input of the summing junction 38 receives a constant position zero calibration signal from a function block 40, and produces as output a signal indicative of the absolute hand-wheel position.

In operation, the hand-wheel position initialization function block 12 of FIG. 4 makes use of the DTW sensor providing P1 and P2 signals, along with a third sensor signal P3 that gives the turn information of the hand-wheel. This signal steps, every 180 degrees, through the lock to lock travel of the hand-wheel, although other step increments, such as, for example, every 90 degrees may be used in alternate embodiments. The function block uses P1 and P2 to provide relative position within 360 hand-wheel degrees. This information is then used with the P3 signal to compute the absolute hand-wheel position that gives absolute hand-wheel position over the entire hand-wheel travel.

Likewise, in FIG. 8, the hand-wheel position initialization function block 112 of FIG. 5 includes a relative hand-wheel position function block 133 that receives the DTW sensor position signals P1 and P2, and produces a signal indicative of the relative hand-wheel position. An unadjusted position function 142 receives the relative hand-wheel position from the function block 133 and a signal indicative of motor position, and produces as output a signal indicative of an unadjusted hand-wheel position.

A vehicle dynamics function 144 receives the signal indicative of unadjusted hand-wheel position from the function 142, a signal indicative of a torque assist command, a signal indicative of a torque applied to the hand-wheel by a driver, a signal indicative of a vehicular speed, and a signal indicative of an assist motor velocity; and produces a first signal indicative of a hand-wheel revolution or turn offset and a latching signal. A travel exclusion function 146 also receives the signal indicative of unadjusted hand-wheel position from the algorithm 142, and produces a set of currently possible hand-wheel revolution or turn offset signals. A stored absolute position is retrieved from a memory location 147, where it was placed during the last EPS system shutdown, and received by a store last position function 148. The algorithm 148 also receives the signal indicative of unadjusted hand-wheel position from the function 142, and produces a signal indicative of the validity of the stored position as well as a signal indicative of the actual revolution offset of the stored position.

A decision making function 150 receives each of the signals indicative of unadjusted hand-wheel position from the function 142, hand-wheel revolution or turn offset and the latching signal from the function 144, set of currently possible hand-wheel revolution or turn offset signals from the function 146, and validity of the stored position as well as the actual revolution offset of the stored position from the function 148; and produces a signal indicative of a selected revolution offset and a signal indicative of a percentage of return motion towards the center of the travel of the hand-wheel. A slew ramp function block 152 receives the signal indicative of the percent of return motion and produces a signal of a percentage of return slew rate.

A walking function block 154 receives the signal indicative of the selected revolution offset from the function 150 and the signal indicative of unadjusted hand-wheel position from the function 142, and produces a signal indicative of a return state (described above with reference to FIG. 2) and a signal indicative of a filtered revolution offset. A summing junction 156 receives at a non-inverting terminal the signal indicative of unadjusted hand-wheel position from the function 142, and receives at an inverting terminal the signal indicative of the filtered revolution offset from the walking function block 154; and produces a signal indicative of the absolute position of the hand-wheel.

Thus, in operation of the absolute hand-wheel position tracking system, the motor position signal provides relative position over the entire rack travel. A zero offset error is calculated between the measured hand-wheel position and absolute position. The error is integrated to provide a motor position calibration or zero point that is subtracted from the motor position to provide the final output absolute hand-wheel position. The error integrator operates only under conditions that are determined by the enable function. Once the motor position zero point has been initialized, absolute position will continue to be updated using motor position, whether or not the error integrator is enabled.

The valid status of the hand-wheel position signals and corresponding fault status are used as conditions to enable the Error integrator. In addition, the motor wind-up with respect to the hand-wheel, which might yield an incorrect value of absolute position if the error was allowed to be integrated, is also used as an enabling condition for the Error Integrator. The method uses assist torque as an input to make a determination of the motor windup.

The diagnostic strategy used checks whether hand-wheel position was calculated on initialization and then provides absolute position information for the duration of that ignition cycle. Thus, faults are logged if signals for hand-wheel position indicated in FIG. 7 and FIG. 8 are determined to be invalid on initialization. If invalid hand-wheel signals are detected during operation, the absolute position continues to be updated based on motor position signals and no critical faults become logged.

An advantage of the absolute hand-wheel position tracking system is that valid initial measured hand-wheel position signals allow for an absolute hand-wheel position signal based on motor position to be provided for the duration of that ignition cycle. The unique approach of using the error integrator and motor position allows for invalid hand-wheel position signals during operation. It also achieves a reliable and robust indirect measurement of absolute hand-wheel position. This makes the function less dependent on the hand-wheel position signals after the function has initialized. If initialized correctly, column hand-wheel position faults need not be logged during operation which will reduce warranty costs. This allows for the use of hand-wheel position sensors that that need only provide valid measured hand-wheel position on initialization.

Accordingly, embodiments of the absolute hand-wheel position tracking system include EPS systems providing a determination of hand-wheel position that is robust to sensor failures that may occur during operation, with the added advantage of low software overhead.

While the description has been made with reference to exemplary embodiments, it will be understood by those of ordinary skill in the pertinent art that various changes may be made and equivalents may be substituted for the elements thereof without departing from the scope of the disclosure. In addition, numerous modifications may be made to adapt the teachings of the disclosure to a particular object or situation without departing from the essential scope thereof.

Therefore, it is intended that the claims not be limited to the particular embodiments disclosed as the currently preferred best modes contemplated for carrying out the teachings herein, but that the claims shall cover all embodiments falling within the true scope and spirit of the disclosure.

What is claimed is:

1. An absolute hand-wheel position tracking system comprising:

means for initializing a signal indicative of hand-wheel position;

means for receiving a signal indicative of motor position;

means for correcting said received signal in accordance with said initialized signal;

means for scaling said corrected signal in accordance with a motor gear ratio; and means for tracking an absolute hand-wheel position corresponding to said corrected and scaled motor position signal in accordance with said initialized signal.

2. A tracking system as defined in claim 1, further comprising:

means for receiving a steering input from a driver;

means for providing an assist torque to said steering input;

means for sensing a position of said providing means;

means for correlating said sensed position with the position of said receiving means;

means for tracking a current absolute position of said receiving means in accordance with said correlating means; and means for controlling said providing means in accordance with said determining means to induce a return-to-center of said receiving means.

3. A tracking system as defined in claim 1, further comprising:

means for determining an initial hand-wheel position;

means for enabling an integrating function in correspondence with said means for determining;

means for sensing a motor position;

means for integrating an offset to said means for sensing to produce a signal indicative of a correction to a signal indicative of a hand-wheel position; and means for producing a signal indicative of an absolute hand-wheel position in correspondence with the sensing means and the integrating means.

4. A method for tracking the absolute hand-wheel position of an electric power steering system, the method comprising:

initializing a signal indicative of hand-wheel position;

receiving a signal indicative of motor position;

correcting said received signal in accordance with said initialized signal;

scaling said corrected signal in accordance with a motor gear ratio; and tracking an absolute hand-wheel position corresponding to said corrected and scaled motor position signal in accordance with said initialized signal.

5. A method as defined in claim 4, further comprising:

controlling an assist motor in accordance with said tracked absolute hand-wheel position to provide a return-to-center assist torque.

6. A method as defined in claim 4, further comprising:

measuring an initial hand-wheel position;

enabling an integrating function in correspondence with said measured hand-wheel position;

sensing a motor position;

integrating an offset to said sensed motor position to produce a signal indicative of a correction to a signal indicative of a hand-wheel position; and producing a signal indicative of an absolute hand-wheel position in correspondence with the sensed motor position and the integrated offset.

7. An absolute hand-wheel position tracking system for an electric power steering system having a hand-wheel, an assist motor for providing an assist torque disposed relative to the hand-wheel, and a motor position sensor responsive to the assist motor disposed at the assist motor; the absolute hand-wheel position tracking system comprising:

a hand-wheel position initialization function responsive to said hand-wheel;

a motor position correction and scaling function responsive to said motor position sensor and responsive to said assist torque;

an enable function responsive to said assist torque and responsive to said hand-wheel position initialization function; and an absolute hand-wheel position generation function in signal communication with said hand-wheel position initialization function, said motor position correction and scaling function, and said enable function.

8. A tracking system as defined in claim 7, further comprising:

an error integration function in signal communication with said hand-wheel position initialization function and said enable function.

9. A tracking system as defined in claim 7, further comprising:

a torque sensor in signal communication with said hand-wheel.

10. A tracking system as defined in claim 7, further comprising:

a relative hand-wheel position function responsive to said hand-wheel; and an absolute hand-wheel position initialization function in signal communication with said relative hand-wheel position function.

11. A tracking system as defined in claim 7, further comprising:

a hand-wheel position sensor disposed relative to said hand-wheel in signal communication with said hand-wheel position initialization function.

12. A tracking system as defined in claim 11, further comprising:

an absolute hand-wheel position initialization function in signal communication with said hand-wheel position sensor.

13. A tracking system as defined in claim 7, further comprising:

an absolute hand-wheel position initialization function.

14. A tracking system as defined in claim 7, further comprising:

a motor position scaler in signal communication with said motor position sensor.

15. A tracking system as defined in claim 14, further comprising:

a motor compliance compensation function responsive to said assist torque.

16. A tracking system as defined in claim 7, further comprising:

an error integration function in signal communication with said hand-wheel position initialization function; and a filtering function in signal communication with said hand-wheel position generation function to produce a signal indicative of an absolute hand-wheel position.

17. A tracking system as defined in claim 16, the filtering function comprising:

a switch box function in signal communication with the hand-wheel position initialization function.

18. A tracking system as defined in claim 16, the filtering function comprising:

a walk function in signal communication with the hand-wheel position generation function.

19. A tracking system as defined in claim 16, further comprising:

a relative hand-wheel position function responsive to the hand-wheel;

a revolution offset index determination function responsive to the hand-wheel;

a hand-wheel position calculation function in signal communication with said relative hand-wheel position function and said revolution offset index determination function; and a zero position calibration function in signal communication with said hand-wheel position calculation function to produce a signal indicative of an initialized absolute hand-wheel position.

20. A tracking system as defined in claim 7, further comprising:

an error limit function in signal communication with said hand-wheel position initialization function; and an offset error integrating function in signal communication with said error limit function and said enabling function to produce a correction to a signal indicative of a motor position.

21. A tracking system as defined in claim 7, further comprising:

a relative hand-wheel position function responsive to the hand-wheel;

a revolution offset index determination function responsive to the hand-wheel;

a hand-wheel position calculation function in signal communication with said relative hand-wheel position function and said revolution offset index determination function; and a zero position calibration function in signal communication with said hand-wheel position calculation function to produce a signal indicative of an initial absolute hand-wheel position.

22. A tracking system as defined in claim 7, further comprising:

a relative hand-wheel position function responsive to the hand-wheel;

an unadjusted position function in signal communication with said relative hand-wheel position function;

a vehicle dynamics function in signal communication with said unadjusted position function;

a travel exclusion function in signal communication with said unadjusted position function;

a store last position function in signal communication with said unadjusted position function;

a decision-making function in signal communication with at least one of said vehicle dynamics function, said travel exclusion function, and said store last position function;

a walk function in signal communication with said decision-making function and with said unadjusted position function; and a summing function in signal communication with said walk function and with said unadjusted position function to produce a signal indicative of an absolute hand-wheel position.

23. A tracking system as defined in claim 22, further comprising a return state generator.

24. A tracking system as defined in claim 22, further comprising a slew ramp function for producing a signal indicative of a slew rate.

25. A tracking system as defined in claim 22, further comprising a storage location for maintaining a stored absolute position during a shutdown.

* * * * *